(12) United States Patent
Gonzalez et al.

(10) Patent No.: US 8,250,649 B2
(45) Date of Patent: Aug. 21, 2012

(54) SECURING SYSTEM AND METHOD USING A SECURITY DEVICE

(75) Inventors: Xavier Gonzalez, Bois D'Arcy (FR); Yann Fleutot, Montigny le Bretonneux (FR); Cyril Moquereau, Neuilly-Plaisance (FR)

(73) Assignee: Cassidian SAS, Elancourt (FR)

( * ) Notice: Subject to any disclaimer, the term of this patent is extended or adjusted under 35 U.S.C. 154(b) by 721 days.

(21) Appl. No.: 12/143,237

(22) Filed: Jun. 20, 2008

(65) Prior Publication Data
US 2008/0320589 A1    Dec. 25, 2008

(30) Foreign Application Priority Data
Jun. 22, 2007    (FR) ..................... 07 04492

(51) Int. Cl.
    G06F 7/04    (2006.01)
(52) U.S. Cl. ........................... 726/19; 726/20
(58) Field of Classification Search ............... 726/8, 19, 726/9, 20; 713/185, 1
    See application file for complete search history.

(56) References Cited

U.S. PATENT DOCUMENTS

| 2001/0043702 | A1 | 11/2001 | Elteto et al. |
| 2002/0029343 | A1* | 3/2002 | Kurita ........................... 713/185 |
| 2003/0079127 | A1* | 4/2003 | Bidan et al. .................... 713/172 |
| 2003/0212904 | A1* | 11/2003 | Randle et al. ................... 713/200 |
| 2004/0136529 | A1* | 7/2004 | Rhelimi et al. .................. 380/44 |
| 2006/0031683 | A1 | 2/2006 | Marion et al. |
| 2008/0162915 | A1* | 7/2008 | Price et al. ....................... 713/2 |

* cited by examiner

Primary Examiner — Samson Lemma
(74) Attorney, Agent, or Firm — Stites & Harbison PLLC; Marvin Petry

(57) ABSTRACT

System (1) for securing a data processing application, the said system comprising:
  first means (2) for interfacing with a security device (3);
  second means (4) for interfacing with the user;
  third means (6) for interfacing with the application and adapted for intercepting any request to use the said security device originating from the said application destined for the said security device;
  authentication means (8) connected to the first and second interfacing means, adapted for authenticating the user as legitimate user of the security device by requesting at least one secret;
  means (10) for storing the result of the authentication;
  validation means connected to the storage means and to the first and third interfacing means, adapted for authorizing any request originating from the application, destined for the said security device if and only if, the user is authenticated.

11 Claims, 3 Drawing Sheets

SECURING SYSTEM AND METHOD USING A SECURITY DEVICE

FIELD OF THE INVENTION

The present invention relates to a securing system and method using a security device. It also relates to a computer program product for implementing the method.

BACKGROUND OF THE INVENTION

To increase the security of information systems, the authentication of users by identifier/password pair is increasingly often being replaced with the use of a security device comprising cryptography means such as a chip card or a USB key containing cryptographic certificates.

An application using such a device systematically triggers a prior authentication step making it possible to verify that the current user is the legitimate user of the security device. This authentication step is conventionally carried out by requesting at least one secret from the current user, a secret known only to the legitimate user and to the security device. This secret is a password or an identification code known in the literature by the name "Personal Identification Number" or "PIN Code".

Thus, if several applications use the security device, the user is required to authenticate himself specifically for each application, thus multiplying the number of times the secret has to be input and therefore the risk of its interception by a third party.

Within the framework of applications whose access is controlled by an identifier/password pair, there exist methods and systems for mutualizing passwords generically called "Single Sign-On" or SSO (Single identification).

Conventionally, there exist two types of SSO operation.

The first type consists of a centralized functionality which intercepts at the level of the server or servers the authentication requests and transforms them so as to avoid the need for the user to authenticate himself several times.

The second type consists of a functionality which executes on the user's station and which fills in the identifier/password fields instead of the user. Thus, each appearance on the screen of an identifier/password request window is detected and the fields are filled in before the user has been able to notice the window.

By way of example, the product CA eTrust Siteminder from the company Computer Associate is of the first type whereas the product CA eTrust SSO from the same company is of the second type.

It is therefore understood that, for the user, the use of a security device appears to be a retrograde step, from the ergonomic standpoint, with respect to the SSO solutions.

SUMMARY OF THE INVENTION

It would therefore be particularly advantageous to develop an authentication system and method which combines the advantage of single identification furnished by the SSO with the increase in the security afforded by the security device.

Thus, according to an aspect of the invention, a system for securing a data processing application comprises:
first means for interfacing with a security device;
second means for interfacing with the user;
third means for interfacing with the application and adapted for intercepting any request to use the said security device originating from the said application destined for the said security device;
authentication means connected to the first and second interfacing means, adapted for authenticating the user as legitimate user of the security device by requesting at least one secret;
means for storing the result of the authentication;
validation means connected to the storage means and to the first and third interfacing means, adapted for authorizing any request originating from the application, destined for the said security device if and only if, the user is authenticated.

According to other characteristics and modes of particular embodiment:
the validation means are adapted for triggering the authentication means if the user is not authenticated;
the system furthermore comprises verification means for checking whether the said application belongs to a list of previously authorized applications, stored in the storage means;
if the application does not belong to the list of authorized applications, the second interfacing means are adapted for requesting the agreement of the user so that the validation means authorize the application to communicate with the said security device;
the authentication means are adapted for requesting an authentication from the user according to a predetermined periodicity;
the system furthermore comprises means for monitoring access to the security device, adapted for detecting and blocking any attempt to access the security device by an application not using the first and/or the third interfacing means.

According to another aspect of the invention, a method of securing an application using a security device to identify a user, the security device authenticating the user by means of at least one secret, comprises the steps of:
intercepting a request for use addressed by the said application to the said security device,
verifying that the user has been authenticated by the security device,
if the user is not authenticated, rejecting the request,
if the user has been authenticated, transmitting the request to the said security device.

According to particular embodiments of this method:
following the interception of the application request, a step of checking whether the said application belongs to a list of authorized applications is performed, so that only the authorized applications have access to the security device,
if the application does not belong to the list of authorized applications, it comprises a step of authorizing the said application by the said user.

According to another aspect of the invention, a computer program product comprises program code instructions for executing the steps of the above method when the said program is executed on a computer.

BRIEF DESCRIPTION OF THE DRAWINGS

The invention will be better understood on reading the description which follows, given solely by way of example and with reference to the appended figures in which.

DETAILED DESCRIPTION OF THE INVENTION

Figure 1:
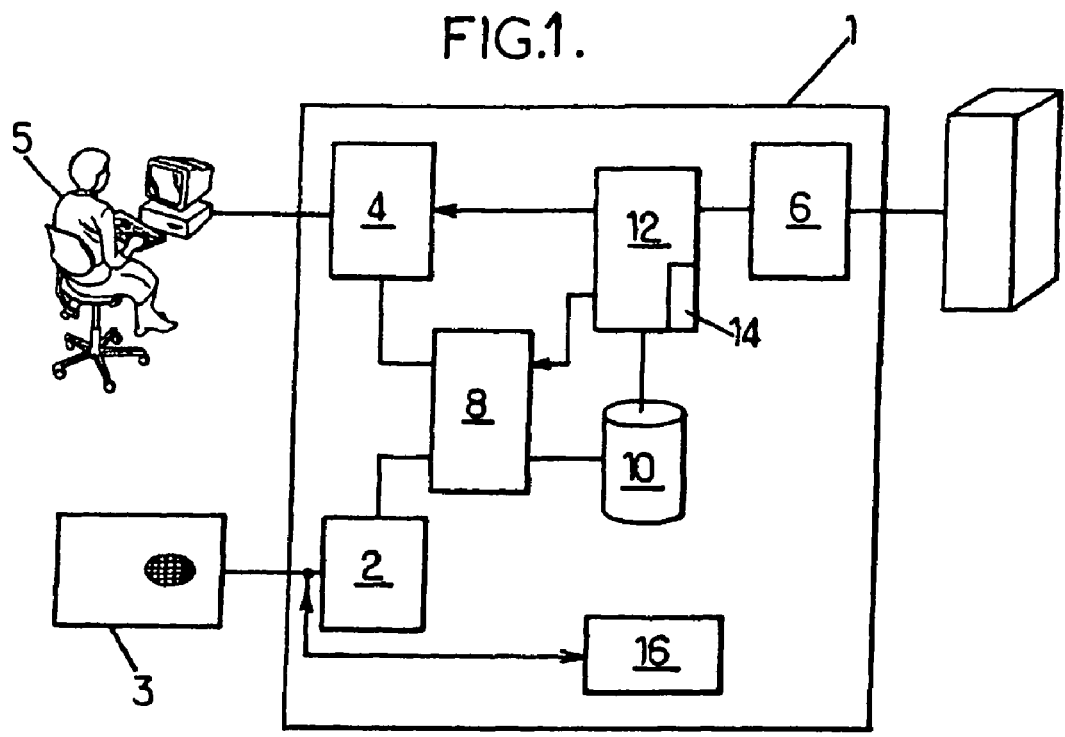
FIG. 1 is a schematic view of an authentication system according to an embodiment of the invention.

With reference to FIG. 1, a securing system 1 comprises first means 2 for interfacing with a security device 3 such as, for example, a chip card or a USB key adapted for processing cryptographic functions.

The securing system 1 also comprises second means 4 for interfacing with a user 5.

According to the architectural split chosen, these two interfaces are purely software components such as function libraries and the hardware connection to the security device as well as the man/machine interface are then processed by the underlying workstation. They can also integrate all or some of the interface hardware. For example, for security reasons, the securing system can be integrated into a computer peripheral comprising a chip card reader.

This securing system 1 comprises third means 6 for interfacing with one or more applications.

These third interfacing means 6 take the form, for example, of a programming interface.

The securing system 1 also comprises authentication means 8. The authentication means 8 are connected to the first and second interfacing means 2, 4 so as to be able to authenticate the user 5.

These authentication means 8 store the result of the authentication in storage means 10. These storage means 10 are embodied, for example, in the form of an addressable field of random access memory or of a permanent file on hard disc.

The securing system 1 comprises validation means 12 connected to the storage means 10 and to the third interfacing means 6. The validation means 12 comprise in particular verification means 14 for checking that the application forms part of a list of authorized applications.

Moreover, the securing system 1 comprises means 16 for monitoring the connection of the security device 3 so as to monitor that no application can access the security device 3 without using the securing system 1.

Figure 2:
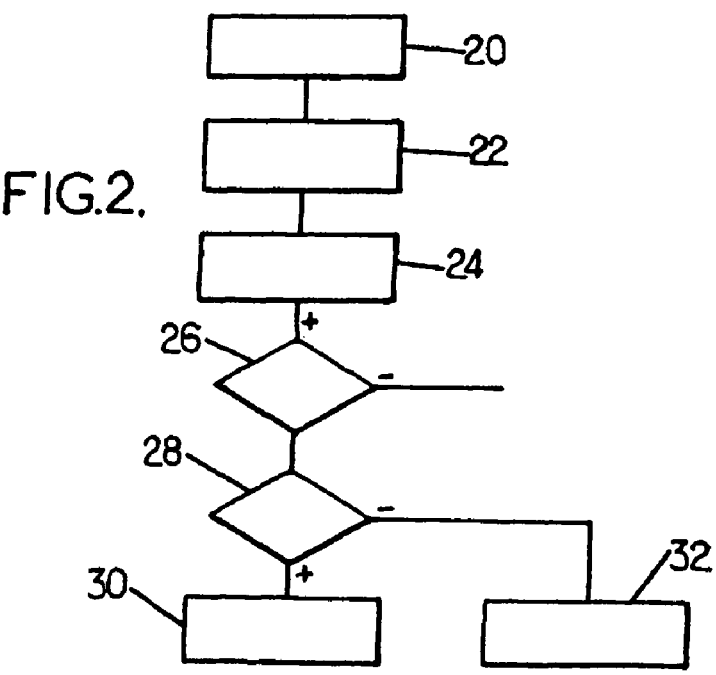
FIG. 2 is a flowchart of an authentication method according to an embodiment of the invention.

The securing system 1 operates as follows, FIG. 2.

In a preliminary authentication step 20, for example upon the introduction of the security device, the user is presented by the authentication means 8 with a window requesting a secret to be input by the user. On receipt of this secret, they have it validated by the security device, thereby ensuring the authentication of the user. This result is stored, in step 22, in the storage means 10.

In a step 24, an application makes a request to the security device.

This request is, for example, an authentication request.

In step 26, the means 14 compare the application with the list of authorized applications stored in the storage means 10.

If the application forms part of this list, the validation means 12 verify in step 28 that the user has been authenticated by consulting the storage means 10.

If the user is authenticated, the validation means 12 authorize, step 30, the application to access the security device 3. It should be noted that if the request is an authentication request, the validation means 12 transmit the information directly to the application in such a way that the user is not requested to enter his secret once again.

If the user was not authenticated correctly, the validation means 12 transmit, step 32, a failure response to the application.

Figure 3:
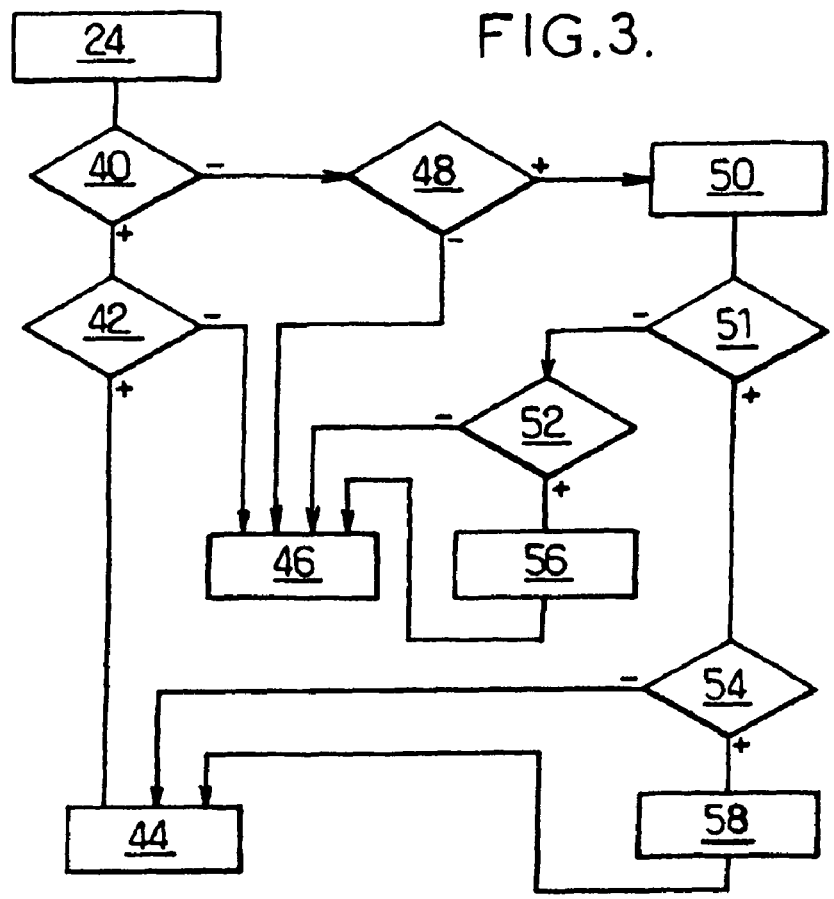
FIG. 3 is a detailed flowchart of a method of application access to a security device according to an embodiment of the invention.

With reference to FIG. 3, the mode of operation when the application does not form part of the list of authorized applications will be detailed.

After the step 24 of requesting access to the security device, the system verifies, step 40, whether the application is known to it.

If it is known, it verifies, step 42, whether it is authorized and, if the response is positive, it gives access to the security device, in step 44.

On the other hand, if the response is negative, the application is rejected in step 46.

If the application is unknown, the system verifies, in step 48, its default policy. Typically this default policy is of two types, either it consists in systematically refusing access to an unknown application, and then the application is rejected in step 46; or it consists in asking, step 50, the user if the user accepts, or rejects, the application, step 51. He chooses to do so definitively or only for the session in progress, steps 52, 54.

If the decision is definitive, the latter is stored, steps 56, 58, in the storage means.

Then, if the application has been accepted, the system gives access to the security device, step 44, and otherwise it rejects the application, step 46.

Figure 4:
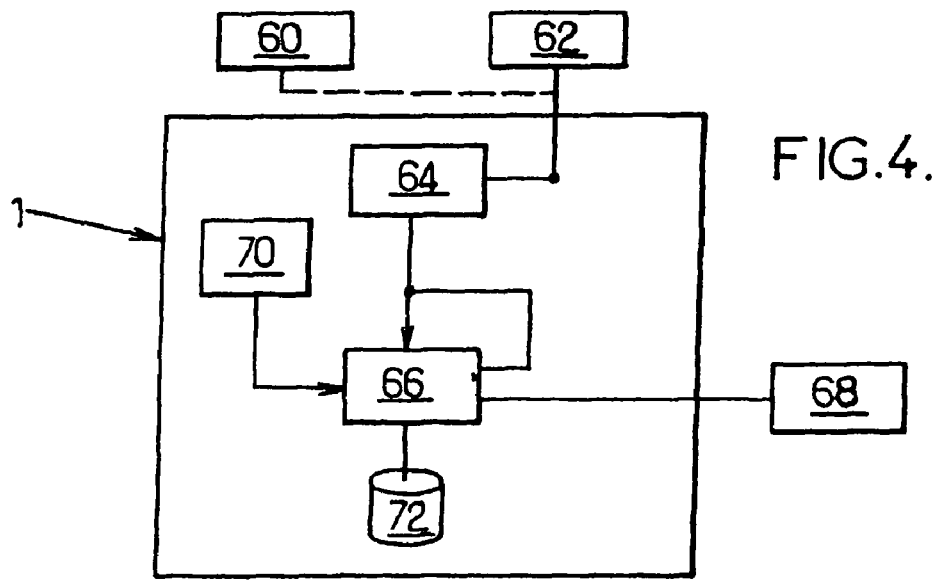
FIG. 4 is a schematic view of a software architecture according to an embodiment of the invention.

A particular software architecture allowing the applications to use the securing system in a transparent manner will now be described with reference to FIG. 4.

This architecture uses standardized programming interfaces such as the PKCS#11 standard and advantageously makes it possible to evolve towards a centralized cryptographic server.

In this architecture, the applications 60, 62 interface to the "client" module 64 through the PKCS#11 interface standard.

The "client" module 64 communicates with a "server" module 66 responsible for the link with the security device 68.

A "management" module 70 makes it possible to configure the "server" module 66. The latter stores its configuration parameters as well as, for example, the results of the authentication, in a file 72.

Figure 5:
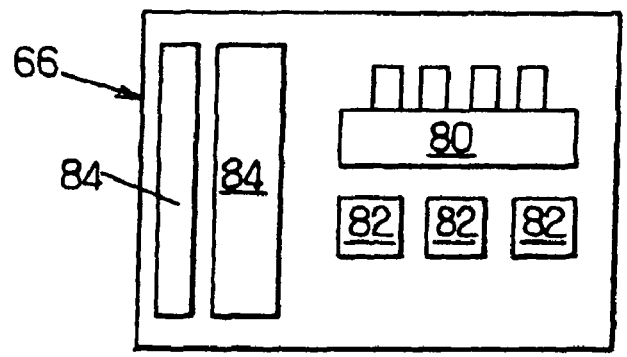
FIG. 5 is a schematic view of the "server" module of the architecture of FIG. 4.

The "server" module 66 is the central component of the system. Its internal architecture is described with reference to FIG. 5.

It comprises a transport layer 80 capable of dialoguing according to data transport standards such as SSL, HTTP, to integrate the component into a wide choice of architectures and products.

It also supports several programming models 82 such as PKCS#11, the "Microsoft Cryptographic Service Provider (HS CSP)", NGSCB or the like.

It also comprises audit and securing modules 84. This component is responsible for asking the user for the secret and for protecting it. It never communicates this secret to other components or applications. It is also the only component to dialogue with the security device.

The "server" module 66 is also in charge of configuration and is the only one authorized to modify the configuration parameters. Thus, it signs the configuration file to guarantee its integrity.

Figure 6:
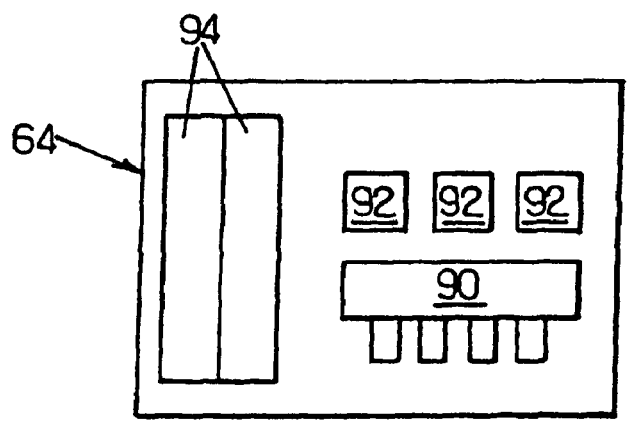
FIG. 6 is a schematic view of the "client" module of the architecture of FIG. 4.

The "client" module 64, FIG. 6, takes the form of a dynamic library which ensures the interface with the application. It implements a standardized interface, such as PKCS#11. The applications 60, 62 use the same standardized protocol to communicate with the "client" module 64. It should be noted that the "client" module 64 can implement several standardized interface protocols thus allowing diverse applications to access the securing system.

The applications 60, 62 execute cryptographic operations through the standardized interface proposed by the "client" module 64. The "client" module 64 then relays the requested operations to the "server" module 66 which carries out the operations with the aid of the security device.

It is worthwhile noting that the standardized interface proposed by the "client" module 64 does not need to use the same standard as the "server" module 66 with the security device.

The "client" module 64 therefore comprises a transport layer 90 for communicating with the "server" module 66 and various interfaces 92 for communicating with the applications, as well as security and audit functions 94.

Figure 7:
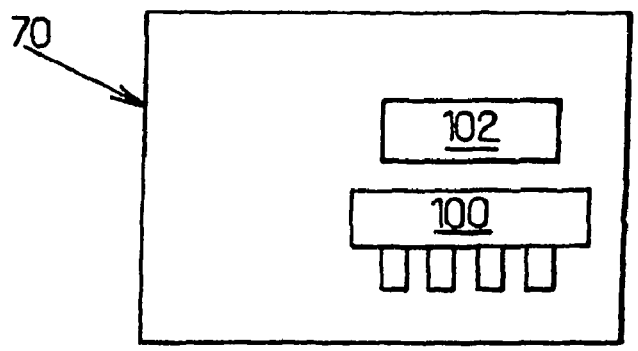
FIG. 7 is a schematic view of the "management" module of the architecture of FIG. 4.

The "management" module 70 also comprises, FIG. 7, a transport layer 100 and interfaces 102 for managing the user interface making it possible to configure and monitor the system.

It receives the configuration from the "server" module 66 and returns the configuration modifications to it, performed by the user or the administrator.

It should be noted that this modular architecture advantageously makes it possible to distribute these various modules on different computers by using secure transport protocols such as SSL between the various modules. For security reasons, only the "server" module needs to be situated as near as possible to the security device.

An authentication system and method have thus been described which carry out a function of SSO type for applications using security devices. Thus, this improves the ergonomics of the user by minimizing the number of times that the latter must enter his secret.

This also increases security by centralizing the management of the secret in a trusted module and by forbidding its disclosure to applications which could be malicious.

It is understood that numerous variants are possible.

For example, the authentication of the user can be performed when a first application requests access to the security device, or else when plugging the security device into the workstation.

Likewise, to enhance security, the authentication system and method can ask the user to enter his secret at predetermined moments, for example, every hour. These moments are managed and modified by the system administrator.

Conversely, verification that the application forms part of a list of authorized applications can be dispensed with if the environment or the security conditions are reduced.

In another variant, the system comprises, FIG. 1, means 16 for monitoring the security device. These monitoring means 16 prevent any application from accessing the security device without passing through the authentication system.

Storage of the authentication can also be carried out in various ways.

In a first mode, the secret is stored and each time that an authentication is requested by an application, the secret is presented to the security device.

In a second mode, the result of the authentication is stored and presented to the applications requesting an authentication.

The authentication method can be carried out in the form of software, that is to say of a computer program product carrying out the method when it is executed on a computer. It can also be carried out in the form of hardware, for example by coding an array of logic gates of FPGA type, or in a mixed form of a programmed box such as, for example, a payment terminal, the latter form of implementation having the advantage of providing a totally controllable environment and therefore of enhancing the security of the whole.

The invention claimed is:

1. A system for securing a data processing application, the said system comprising:
   a first interface interfacing with a security device holding user authentication information;
   a second interface interfacing with a user;
   a third interface interfacing with the application and implemented to intercept any request to use the security device originating from the application destined for the security device;
   a user authenticator connected to the first and second interfaces and implemented to perform an authentication of the user as a legitimate user of the security device by requesting at least one secret;
   a storage device receiving and storing the result of the authentication; and
   a validator connected to the storage device and to the first and third interfaces, the validator being implemented to authorize any request originating from the application, destined for the security device upon and only upon, the user being authenticated as a legitimate user of the security device.

2. A securing system according to claim 1, wherein the validator is implemented to trigger the authenticator if the user is not authenticated.

3. A securing system according to claim 1, further comprising a verifier that determines whether the application belongs to a list of previously authorized applications stored in the storage device.

4. A securing system according to claim 3, wherein, upon determining that the application does not belong to the list of authorized applications, the second interface requests an agreement of the user to enable the validator to authorize the application to communicate with the security device.

5. A securing system according to claim 1, wherein the authenticator is implemented to request the at least one secret for performing the authentication from the user according to a predetermined periodicity.

6. A securing system according to claim 1, further comprising a monitoring module monitoring access to the security device, the monitoring module being implemented to detect and block any attempt to access the security device by an application without using the first interface and/or the third interface.

7. A method for securing an application using a security device that holds user authentication information to identify a user carried out by a system comprising the security device, the security device authenticating the user by means of at least one secret, the method comprising:
   intercepting a request to use the security device addressed by the application to the security device,
   verifying whether the user has been authenticated by the security device,
   upon failing to verify that the user is authenticated, rejecting the request, and
   upon verifying that the user has been authenticated, transmitting the request to the security device.

8. The securing method according to the claim 7, further comprising, upon interception of the application request, determining whether the application belongs to a list of authorized applications, so that only the authorized applications have access to the security device.

9. The securing method according to claim 8, further comprising, upon determining that the application does not belong to the list of authorized applications, authorizing the application by the user.

10. A non-transitory computer-readable storage medium, with computer-readable instructions stored thereon for execution by a processor to perform the method according to claim 7.

11. A non-transitory computer-readable storage medium, with a program stored thereon, wherein the program comprises program code instructions for performing the means functions of the securing system according to claim 1 when the said program is executed on a computer.

* * * * *